Patented Oct. 9, 1945

2,386,737

UNITED STATES PATENT OFFICE 2,386,737

CYANOETHYLATED CYCLIC KETONES

Herman A. Bruson, Philadelphia, Pa., assignor to
The Resinous Products & Chemical Company,
Philadelphia, Pa., a corporation of Delaware No Drawing. Original application April 19, 1941,
Serial No. 389,332. Divided and this application
June 13, 1941, Serial No. 397,865

3 Claims. (Cl. 260—464)

This invention relates to cyclic ketones having at least one β-cyanoethyl radical on a carbon atom adjacent to the carbonyl group of the cycle. More particularly it relates to poly-β-cyanoethylated cyclic ketones of the above type.

This invention is a division of my copending application, Serial No. 389,332, filed April 19, 1941.

According to this invention, acrylonitrile is reacted in the presence of an alkaline condensing agent with a cyclic ketone having an active methylene or methenyl group immediately adjacent to its carbonyl group. By the reaction, a β-cyanoethyl radical becomes attached to the carbon atom adjacent to the carbonyl group. If more than one active hydrogen is present on this carbon atom, then more than one cyanoethyl group may be introduced.

Among the alkaline condensing agents which have been found effective for promoting the reaction are the oxides, hydroxides, hydrides, amides, and alcoholates of the alkali metals or the alkali metals themselves. There may also be used other strongly basic non-metallic hydroxides such as the quaternary ammonium hydroxides. Of these, a particularly effective product is the aqueous solution containing 40% of trimethyl benzyl ammonium hydroxide which is available commercially under the trade name "Triton B". One or several of these materials are suspended or, preferably, dissolved in the ketone itself or in a solution of the ketone in an inert liquid, such as dioxane, ether, or benzene, or in a liquid which is less reactive than the reacting ketone, such as water, or tertiary butyl alcohol.

The quantity of alkaline condensing agent required is usually relatively small, amounts of the order of 1% to 10% on the combined weight of the reactants usually being sufficient. Since the condensation ceases if the alkali is depleted by side reactions or impurities of an acid nature in the starting materials, it is advantageous to test the reaction mixture for alkalinity toward red litmus from time to time during the condensation and, if an alkaline reaction is no longer shown, to add more alkali to make up for the loss.

The reaction is applicable to a wide variety of monocyclic or polycyclic ketones of the cycloaliphatic, hydroaromatic or heterocyclic series, including saturated or unsaturated mono-ketones or poly-ketones. The ketones may contain other functional groups than the carbonyl group, so long as they do not readily destroy the alkaline condensing agent used. For example, these groups may be chloro, acyl, alkoxy, aryloxy, thioether, tertiary amino, sulfonyl, carbalkoxy, carbamyl, thiocyano, cyano, or hydrocarbon groups, such as alkyl, aralkyl, cycloalkyl, or aryl groups, etc.

Among the more readily available typical cyclic ketones, having reactive hydrogen atoms ortho to the carbonyl groups which are suitable for the purpose of this invention, may be mentioned the following: Cyclopentanone, cyclohexanone, p-phenyl cyclohexanone, o-, m-, or p-methyl cyclohexanone, menthone, p-ter-butyl cyclohexanone, p-ter-amyl cyclohexanone, p-ter-octyl cyclohexanone, o,p-di-tertiary amyl cyclohexanone, p-benzyl cyclohexanone, p-cyclohexyl-cyclohexanone, cyclohexenones, α- or β-tetralone, cholestanone, 2,2,5,5-tetramethyl-tetrahydro - furanone - 3,N-methyl-triacetone-amine, α- or β-hydrindone, cyclohexylidene-cyclohexanone, o-methallyl cyclohexanone, o-benzal cyclohexanone, cycloheptanone, and homologues thereof.

Depending upon the number of available hydrogen atoms in the reactive methylene or methenyl groups contiguous to carbonyl in the ketones used, and upon the quantity of acrylonitrile employed, one or more β-cyanoethyl groups may be introduced. The condensation takes place readily at temperatures from about 0° to about 80° C., although initial temperatures of 25° C. to 60° C. are preferred. The reaction is usually exothermal, so that cooling, at least during the early part of the condensation, is generally advantageous in order to control the vigor of the reaction and to prevent undesired polymerization or side reactions. In this connection it is sometimes desirable to add polymerization inhibitors, such as hydroquinone, alpha-naphthol, catechol, finely divided copper compounds, or sulfur.

In general, cyclic ketones having the carbonyl between two —CH₂— groups, as in cyclopentanone, cyclohexanone, and their meta- or para-substituted homologues, readily take up as many as four mols of acrylonitrile as follows:

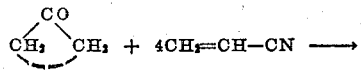

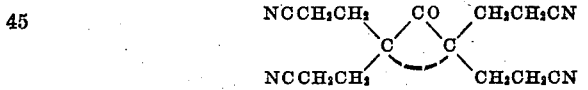

whereas a mono- ortho-substituted cyclic ketone, as for example o-methyl cyclohexanone, takes up as many as three mols of acrylonitrile

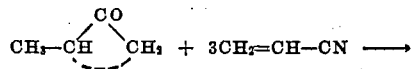

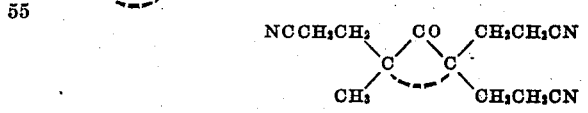

Finally, ketones such as α-tetralone or α-hydrindone, which possess only two reactive ortho hydrogen atoms, take up to two mols of acrylonitrile.

The β-cyanoethylation products obtainable by the present process are all new compounds. They are useful as intermediate for the preparation of monocarboxylic or polycarboxylic acids, amides, esters, amines, or polyamines, amidines, amino acids, amino alcohols, or thio-amides by the reactions characteristic of the nitrile group. Many of the compounds may find uses in diverse fields, including synthetic resins, artificial fibers, plastics, plasticizers, dyestuffs, pharmaceuticals, insecticides, textile finishing, and other commercial applications.

The following examples illustrate this invention, it being understood that, although trimethyl benzyl ammonium hydroxide is the preferred alkaline condensing agent, others, such as sodium ethylate, potassium tertiary amylate, sodium methylate, potassium hydroxide, lithium hydroxide, sodamide, sodium metal, sodium hydride, sodium oxide, sodium hydroxide, tetramethyl ammonium hydroxide, tetra-ethanol ammonium hydroxide, benzyl triethyl ammonium hydroxide, dimethyl dibenzyl ammonium hydroxide, and other quaternary ammonium hydroxides, or other strong bases may be used.

*Example 1*

To a solution of 42 g. of cyclopentanone (0.5 mol) in 200 g. of benzene, there was added 5 g. of an aqueous 40% solution of trimethyl benzyl ammonium hydroxide. The mixture was stirred and cooled to 35-45° C., while 106 g. of acrylonitrile (2 mols) was added dropwise during 1½ hours. Crystals began to separate within a few minutes after the addition was begun. As the reaction proceeded, it was necessary to add 200 cc. of benzene to prevent clogging of the stirrer by the crystalline mass. The mixture was allowed to stand for 18 hours before the crystals were filtered by suction. The yield was 144 g. or 97.3% of theory. The product can be recrystallized from hot methyl ethyl ketone or glycol monoethyl ether ("Cellosolve") from which it separates in colorless crystals, melting, when pure, at 175° C. Its analysis corresponds to tetra (β-cyanoethyl)-cyclopentanone, having the formula

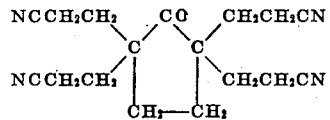

It is only very slightly soluble in benzene, toluene, dioxane, or water.

Upon boiling the above product with an excess of aqueous 10% sodium hydroxide for four hours, the nitrile groups are quantitatively hydrolyzed and, upon acidification of the solution and cooling, there is obtained the corresponding tetra-(β-carboxy-ethyl)-cyclopentanone

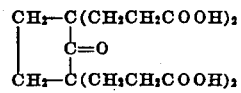

which may be recrystallized from water and forms colorless crystals melting at 173° C.

*Example 2*

Acrylonitrile (24.4 g.) was added dropwise to a stirred solution consisting of 50 g. of dioxane, 3 g. of aqueous 40% trimethyl benzyl ammonium hydroxide, and 33 g. of 3-oxo-2,2,5,5-tetramethyl tetrahydrofurane (Dupont, Compt. rend. 152, 1486) while the reaction temperature was maintained between 35° and 40° C. by means of external cooling. The mixture was then stirred three hours longer at 25° C. During the addition, crystals separated. The mixture was neutralized with dilute hydrochloric acid and filtered. The yield was 41 g. of colorless crystals. Upon recrystallization from ethyl alcohol, the compound formed colorless needles melting at 153° C., having the formula

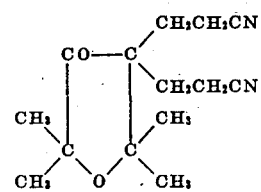

*Example 3*

21.2 g. of acrylonitrile was added at room temperature to a mixture of 29.2 g. of α-tetralone, 50 g. of dioxane, and 4 g. of aqueous 40% trimethyl benzyl ammonium hydroxide solution. The mixture was stirred for 24 hours, then neutralized with dilute hydrochloric acid, washed with water and distilled in vacuo. The fraction boiling at 250–260° C./1 mm. formed a pale yellow oil which gradually solidified to a waxy crystalline mass. After recrystallization from ethanol, the product formed colorless crystals melting at 80° C., having the formula

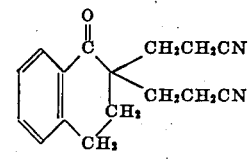

*Example 4*

To 935 g. of tertiary butanol there was added 15 g. of aqueous 40% potassium hydroxide solution and 294 g. of cyclohexanone (3 mols). The solution was stirred in a vessel surrounded by running water, and 636 g. of acrylonitrile (12 mols) added dropwise thereto during 1½ hours, while the temperature was maintained between 35° and 45° C. During the addition crystals separated. The mixture was stirred for an additional 15 hours at 25° C. to complete the reaction. The crystals were then filtered off, washed with 1 liter of cold water, and dried. The yield was 820 g. of faintly yellow crystalline product or 88% of theory. Upon recrystallization from acetone, the compound forms colorless fine needles, melting when pure at 165° C. Its analysis corresponds to tetra-(β-cyanoethyl)-cyclohexanone having the formula

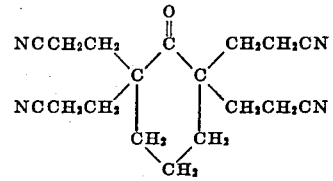

It is only slightly soluble in benzene or methanol. When boiled with aqueous 10% potassium hydroxide solution, the tetra-(β-cyano-ethyl)-cyclohexanone is readily hydrolyzed to the corresponding tetra-(β-carboxy - ethyl)-cyclohexanone, which separates in the form of colorless crystals upon acidifying the reaction mixture with hydrochloric acid. Upon recrystallization from hot water, it forms colorless crystals melting at 179–180° C.

*Example 5*

To a rapidly stirred mixture of 98 g. of cyclohexanone (1 mol) and 5 g. of aqueous 40% trimethyl benzyl ammonium hydroxide, 53 g. of acrylonitrile (1 mol) was added dropwise during 1¼ hours while the reaction temperature was maintained at 30–35° C. by external cooling. After the addition, the mixture was stirred for one hour at 35° C. and then at 25° C. for 18 hours. The reaction mixture was acidified with dilute hydrochloric acid and the crystalline tetra-(β-cyanoethyl)-cyclohexanone (30 g.) filtered off. The filtrate was then distilled in vacuo. A colorless oil (16.5 g.) distilled over at 138–142° C./10 mm., consisting of mono-(β-cyanoethyl)-cyclohexanone.

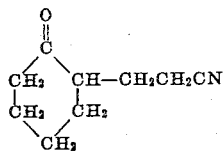

At 195–198° C./1 mm., a second fraction (13 g.) distilled over as a very viscous, pale yellow oil which gradually crystallized on standing. After recrystallization from benzene, it formed colorless crystals melting at 69.5° C. Its analysis showed it to be a di-(β-cyanoethyl)-cyclohexanone.

*Example 6*

To a stirred mixture consisting of 5 g. of aqueous 40% trimethyl benzyl ammonium hydroxide, 200 g. of benzene and 44.8 g. of ortho-methyl-cyclohexanone there was added dropwise 63.5 g. of acrylonitrile while the reaction temperature was maintained at 30–40° C. by cooling. The mixture was stirred thereafter for 18 hours at 25° C., neutralized with dilute hydrochloric acid, washed thoroughly with water, filtered, and distilled in vacuo. The main fraction (103 g.) distilled at 275–285° C./1 mm., as a pale reddish syrup consisting essentially of tri-(β-cyanoethyl)-o-methyl-cyclohexanone

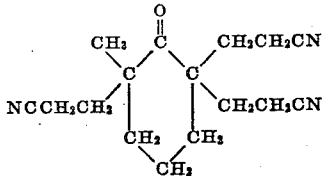

*Example 7*

To a solution of 45.6 g. of ortho-methallyl-cyclohexanone, 100 g. of benzene, and 3 g. of aqueous 40% trimethyl benzyl ammonium hydroxide there was added dropwise with rapid stirring while the mixture was cooled to 30–40° C. 47.7 g. of acrylonitrile during a period of 45 minutes. The mixture was then stirred at room temperature for two hours and finally heated on a water bath at 50° C. for 2½ hours. The product was washed with water containing a little hydrochloric acid to destroy the alkali, and the washed oil layer was filtered to remove polymeric impurities. The filtrate was then distilled in vacuo. The main fraction boiled between 230° and 270° C./1–3 mm. and formed a pale reddish oil consisting essentially of tri-(β-cyanoethyl)-methallyl-cyclohexanone.

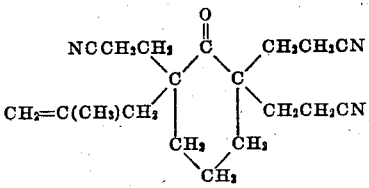

*Example 8*

To a solution of 104 g. of menthone, 200 g. of dioxane, and 10 g. of aqueous 40% trimethyl benzyl ammonium hydroxide there was added dropwise during two hours 107 g. of acrylonitrile while the reaction mixture was stirred and cooled to 28–40° C. The mixture was stirred thereafter for 24 hours at room temperature, acidified with dilute hydrochloric acid, taken up in ethylene dichloride and the ethylene dichloride solution thoroughly washed with water and separated. Upon evaporation of the solvent under reduced pressure there remained 189 g. of a dark, viscous syrup. Upon distillation in vacuo, this yielded a pale reddish oil, boiling at 295–300° C./1 mm., consisting of tri-(β-cyanoethyl)-menthone.

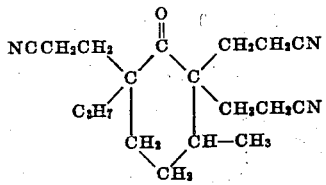

*Example 9*

To a solution of 51 g. of p-methyl cyclohexanone, 120 g. of tertiary butanol and 5 g. of aqueous 40% trimethyl benzyl ammonium hydroxide there was added dropwise 96.5 g. of acrylonitrile during a two-hour period, while the reaction mixture was stirred and cooled to 38–40° C. The mixture was stirred for four hours after the addition had been made, and was then neutralized with dilute hydrochloric acid. The crystalline product was filtered off and washed with a little ethyl alcohol. The yield was 134.5 g. or 91% of theory. The product may be recrystallized from glycol monoethyl ether ("Cellosolve") and forms colorless crystals melting at 138.5° C. Its analysis corresponds to tetra-(β-cyanoethyl)-p-methyl-cyclohexanone, having the formula

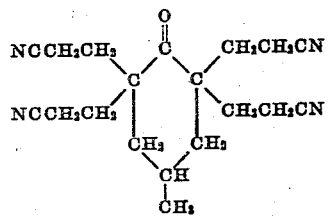

When boiled with excess aqueous 10% potassium hydroxide solution for four hours and acidified, the corresponding tetra-(β-carboxy-ethyl)-p-methyl cyclohexanone is obtained as a colorless crystalline compound melting at 205–206° C.

*Example 10*

Acrylonitrile (85 g.) was added dropwise during one hour to a stirred solution of 67 g. of para-tertiary-amyl-cyclohexanone, 150 g. of dioxane, and 5 g. of aqueous 40% trimethyl benzyl ammonium hydroxde while the reaction mixture was cooled to 30–40° C. The mixture was stirred for five hours thereafter at room temperature. It was then acidified with dilute hydrochloric acid, taken up in ethylene dichloride, washed with water, and the ethylene dichloride layer evaporated to dryness under reduced pressure on a steam bath. The residue weighed 150 g. and was a pasty, crystalline mass which was triturated with ethyl alcohol, filtered and recrystallized from glycol monoethyl ether. It formed colorless crystals, melting at 145° C., having the formula

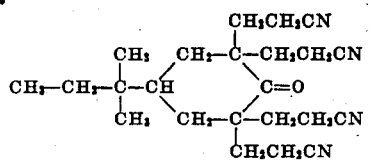

*Example 11*

To a solution of 63 g. of p-α,α,γ,γ-tetramethyl-butylcyclohexanone (0.3 mol) in 100 g. of dioxane there was added 3 g. of an aqueous 40% solution of trimethyl benzyl ammonium hydroxide. The mixture was stirred and cooled to 30–40° C., while 63.6 g. of acrylonitrile (1.2 mols) was added dropwise thereto during 1¼ hours. The mixture was stirred for about one hour longer at room temperature (25–30° C.) and was then warmed to 43° C. for two hours. It was cooled, acidified with dilute hydrochloric acid and washed with water. The oil was then dried on a steam bath under reduced pressure. When cold, it formed a pasty, crystalline mass weighing 118 g. The product can be recrystallized from boiling methanol. It separates in colorless needles melting, when pure, at 155–156° C. Its analysis corresponds to tetra-(β-cyanoethyl)-ter-octyl-cyclohexanone having the formula

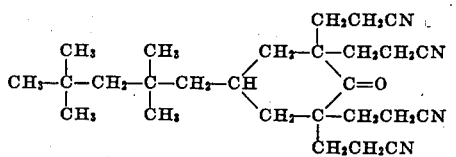

*Example 12*

Acrylonitrile (97.5 g.) was added dropwise during one hour to a stirred solution of 83 g. of para-cyclohexyl-cyclohexanone, 150 g. of dioxane, and 5 g. of aqueous 40% trimethyl benzyl ammonium hydroxide while the reaction mixture was cooled to 30–38° C. The mixture was stirred thereafter for three hours, then acidified with dilute hydrochloric acid, taken up in ethylene dichloride, washed with water, and the ethylene dichloride layer evaporated to dryness under reduced pressure on a steam bath. The residue weighed 180 g. and formed a soft, sticky, resinous mass. Upon stirring this mass with hot methanol, it crystallized and was filtered hot. The crystalline product, upon recrystallization from glycol monoethyl ether, separated in colorless crystals melting, when pure, at 223–224° C., having the formula

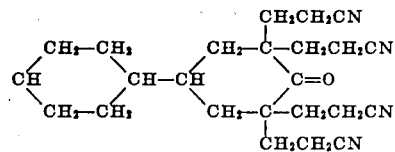

I claim:

1. A method for the β-cyanoethylation of a cyclic ketone having at least one hydrogen atom on a carbon atom adjacent to the carbonyl group of the cycle, which comprises condensing acrylonitrile with said cyclic ketone in the presence of a strongly basic quaternary ammonium hydroxide.

2. A method for the β-cyanoethylation of an alicyclic ketone having at least one hydrogen atom on a carbon atom contiguous to the carbonyl group of the cycle, which comprises condensing acrylonitrile with said alicyclic ketone in the presence of a strongly basic quaternary ammonium hydroxide.

3. A method for the β-cyanoethylation of an alicyclic ketone having at least one hydrogen atom on a carbon atom contiguous to the carbonyl group of the cycle, which comprises condensing acrylonitrile with said alicyclic ketone in the presence of trimethyl benzyl ammonium hydroxide.

HERMAN A. BRUSON.